Figure 2:
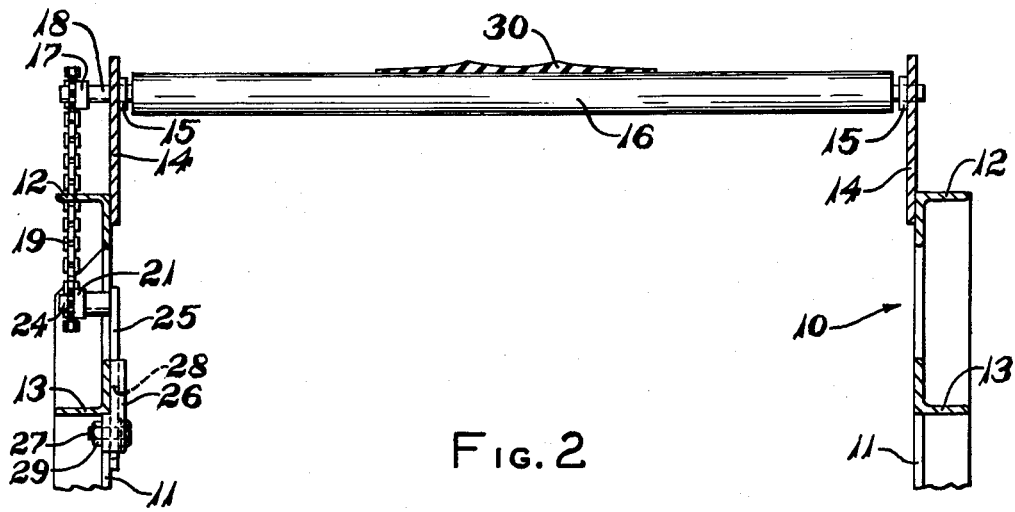

Dec. 5, 1961 F. K. BARNS 3,011,211
ELASTOMERIC STRIP SHRINKING APPARATUS AND METHOD
Filed Feb. 25, 1960 2 Sheets-Sheet 1
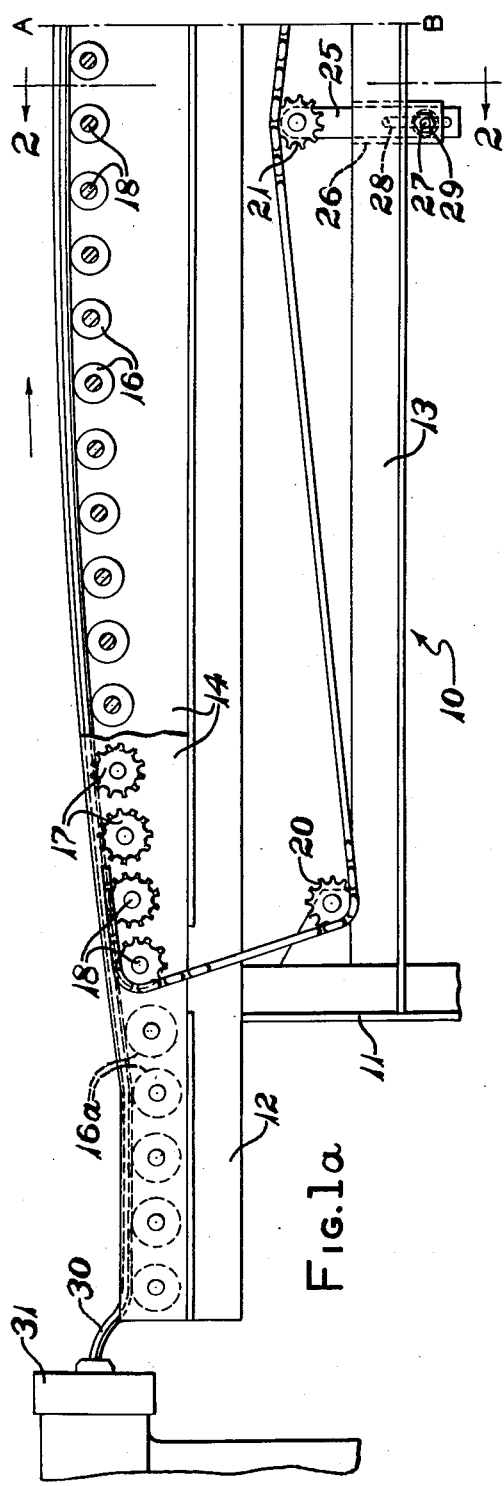
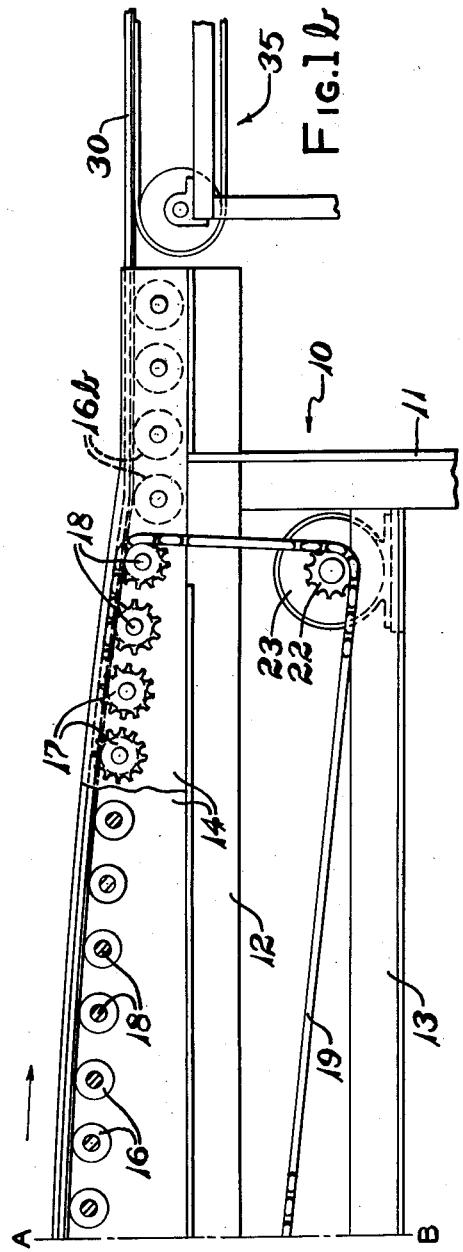
INVENTOR.
FRED K. BARNS
BY
ATTY.

INVENTOR.
FRED K. BARNS
BY W. A. Shira, Jr.
ATTY.

3,011,211
Patented Dec. 5, 1961

3,011,211
ELASTOMERIC STRIP SHRINKING APPARATUS AND METHOD
Fred K. Barns, Akron, Ohio, assignor to The B. F. Goodrich Company, New York, N.Y., a corporation of New York
Filed Feb. 25, 1960, Ser. No. 11,064
5 Claims. (Cl. 18—2)

This invention relates to a method of and apparatus for the elimination of residual shrinkage in elastometric material, and, more particularly, to the elimination of longitudinal shrinkage in elastomeric material following its formation into elongated strips. Although for simplicity of presentation the invention is hereinafter specifically disclosed as it pertains to the manufacture of rubber vehicle tires, it will be readily apparent to those skilled in the art that the invention is also applicable to the manufacture of many other elastomeric articles such as floor tile, soling for footwear, matting and other items in which there are problems similar to those connected with the manufacture of treads for vehicle tires.

In the manufacture of vehicle tires, particularly those types produced in large volume for passenger vehicles, the tire tread strip is generally formed by extrusion or a combination of extrusion and roller die contouring of the rubber stock at an elevated temperature. As the rubber stock is extruded and contoured, internal longitudinal stresses are created in the strip. These stresses relieve themselves through longitudinal shrinking of the strip whether the latter be in a continuous length or cut into discrete pieces. This has been a serious problem in the manufacture of vehicle tires since tread stock cut shortly after its extrusion to a proper length for exactly encircling the carcass of a tire will shrink, if allowed to stand before use, until the strip is several inches too short. For example, it has been found that tread strips will continue to shrink for as long as 24 hours after extrusion and that this shrinkage may be as much as 6 or 7 inches from an original length of 58 inches, for one size of tire, when the strip is allowed to stand in an open, soapstone lubricated flat pan. Consequently, it has been customary to cut the tread lengths to a length somewhat longer than the desired final length to allow for this shrinkage and then, at the time the strip is to be placed about the tire carcass and spliced, the strip is cut a second time to the required length. This double cutting of the strip results in increased labor cost and a high percentage of scrap.

Attempts have been made in the past to reduce tread strip shrinkage by allowing the strips to pass through a long conveyor system, during which passage the strips were allowed to shrink either while festooned freely or while in contact with the conveyor belts. Such systems require an excessive amount of valuable floor space without effecting the desired reduction in shrinkage. These failures can be explained in part by the effect of gravity upon the festooned stock opposing the shrinkage forces, and by the friction between the contacting surfaces of the stock and the conveyors, which likewise hampers shrinkage of the stock.

Attempts to increase the completeness of the shrinkage by heating the tread strip while passing through a conveyor system, either by having a portion of the conveyor means heated or by having an external heat source such as infrared lamps, have not been completely successful and frequently have introduced other difficulties such as a semi-cured condition in the localized spots of the strip resulting from excessive heating and distortion whenever the conveyor is stopped for any reason. Furthermore, while the application of heat accelerates the relief of stresses, completeness of that relief is still limited by the factors mentioned above.

The principal object of this invention is, therefore, to provide an improved method and apparatus for producing elastomeric material in strip form from which substantially all longitudinal shrinkage has been removed.

A more specific object of this invention is to provide an improved method and apparatus for forcibly shrinking a strip of elastomeric material such as a strip of rubber tire tread stock, thus removing therefrom residual shrinkage and obviating the necessity for double cutting when the strip is employed in cut lengths.

Another object of the invention is to provide an apparatus for reducing residual shrinkage of elongated elastomeric material cooperating with strip forming means whereby longitudinal shrinkage of the strip is forcibly removed while the material is moved from the forming means.

A further object of the invention is to provide an improved apparatus for shinking tread stock in strip form, wherein a series of parallel rollers of uniformly decreasing diameters in the direction of tread strip travel are driven at the same rotational speed with resultant incremental reductions in their respective peripheral speed so that a tread strip conveyed by said rollers is progressively and forcibly shrunk throughout its length.

Figure 3:
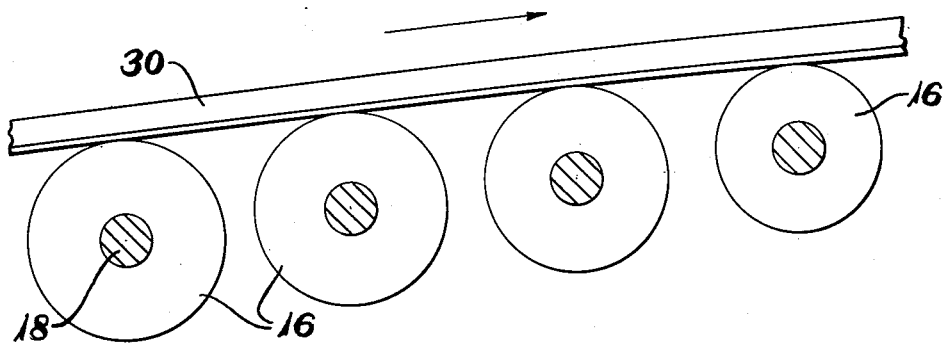

The invention further resides in certain novel steps of procedure and in features of the construction, combination and arrangement of the apparatus parts, and further objects and advantages of the invention will be apparent from the following description of the presently preferred embodiment described with reference to the accompanying drawings forming a part of the application in which:

FIGS. 1a and 1b when united along the dot-dash line A—B together form a somewhat schematic side elevational view of the apparatus with portions partially cut away to more clearly show detailed construction;

FIG. 2 is a fragmentary transverse sectional view taken on line 2—2 of FIG. 1a showing details of vertical side supports and mounting arrangements of one of the driven conveyor rolls; and FIG. 3 is an enlarged, fragmentary, partially sectional view of a portion of FIG. 1a.

The method of this invention in its preferred embodiment is employed in the preparation of elastomeric tire tread strip in the form of preshrunk, predetermined lengths each adaptable for use on a tire carcass without further end trimming or stretching. This procedure comprises forcing the material in a hot plastic condition through a suitable shaping means such as an extruder and/or roller dies so that it emerges as an elongated continuous strip of proper cross-section. The strip so formed is then caused to pass over a series of closely spaced driven rolls having incrementally reduced peripheral speeds in the direction of movement of the strip. This effects an additive retardation of the longitudinal travel of the strip while it is still at elevated temperature, thereby causing a forced shrinking of the strip, the extent of which shrinkage is such that there is now substantially no additional shrinkage after the strip has cooled.

One form of the apparatus for performing this method is illustrated in FIGS. 1a, 1b and 2 as including a suitable frame 10 comprising spaced stanchions 11 to which are attached upper longitudinal supports 12 and lower longitudinal supports 13. Attached to the upper longitudinal supports 12 are spaced vertical side supports 14.

Journaled in bearings 15 mounted on the side supports 14 are a plurality of rollers 16. The rollers in the central portion of the apparatus 10 have diameters which are incrementally reduced from left to right as viewed in FIGS. 1a and 1b and have identical sprockets 17 attached to their ends 18 extending through the vertical side supports 14. Passing about sprockets 17 is a drive chain 19 which also passes about idler sprockets 20 and 21 and drive sprocket 22. The sprocket 22 is driven directly from a speed reducer 23 connected to a drive motor not shown.

The rollers 16 are so arranged that the loci of their axes define a convex curve which is preferably an inverted catenary. As is well known, a catenary is the natural curve which is formed by a chain supported only at its ends. Since the sprockets 17 on each of the rollers 16 are identical it follows that the driven chain 19 will also conform to the inverted catenary shape defined by the roller axes. Hence the chain engages the sprockets 17 equally in such a manner as to eliminate the necessity for intermediate chain tensioning sprockets, thereby permitting closer spacing of the rollers 16. This is desirable since the spacing between the rollers 16 should not be so great as to permit the particular hot plastic material being shrunk to drape appreciably between the rolls. Such draping would, by virtue of the gravitational forces acting upon the material, induce a longitudinal stretching of the material, thus defeating the purpose of the invention.

The drive chain 19 is simultaneously tensioned about all of the sprockets 17 by sliding the idler sprocket 21 upwards as seen in FIGS. 1a and 2. This is made possible by the fact that sprocket 21 is rotatably mounted on a shaft 24 which is carried by slide member 25. The member 25 is slidably mounted in a guide bracket 26 which is mounted on lower longitudinal support 12. A bolt 27 passing through aligned slots 28 in slide member 25 and bracket 26 is provided with a nut 29 for clamping the parts in adjusted position.

The apparatus 10 of the invention may be used with any desired apparatus for forming elastomeric material into elongated strip form while in hot plastic condition. Such a strip forming machine is shown herein as an extruder 31 positioned such that the strip material 30 issuing therefrom discharges directly onto the shrinkage apparatus with the line of travel of the strip 30 at right angles to the axes of the rollers 16.

In operation, a tread strip 30 issues from an extruder 31 onto the free wheeling rollers 16a of the apparatus, and passes thereover to the driven rollers 16. Being freshly extruded the tread 30 is in a hot, semi-plastic state. Because all of the rollers 16 have identical drive sprockets 17, they are driven at the same rotational speed. However, due to the fact that their diameters are gradually reduced in the direction of travel of the strip 30 the respective peripheral speeds are gradually reduced. This gradual reduction in peripheral speed of the rollers 16 forces the strip 30 to contract longitudinally as it passes over the rollers 16, thus forcibly shrinking the strip 30 and thereby removing the residual stresses created in the strip at the time of its extrusion.

As the strip 30 leaves the driven rollers 16 it passes onto free wheeling rollers 16b and is taken from the apparatus through further processing equipment by means of a conveyor 35.

The specific example which follows will serve to illustrate the amount of shrinking obtainable through the use of the invention. In the preferred embodiment of the invention as shown in the drawings the installation comprises 26 driven rollers 16, equally spaced at 3.648 inches between centers. The first, or entrance roll, has an outside diameter of 2.250 inches with each succeeding roller decreased in outside diameter by .010 inch so that the last or exit roller has a diameter of 2.000 inches. Thus, because the rollers have identical drive sprockets and are directly driven by a common chain, they will have the same rotational but different peripheral speeds. Based upon a peripheral speed of the first roll of 540 inches per minute, the last roll will have a peripheral speed determined by the following formula:

$$\frac{d_1}{d_2} = \frac{540}{x}$$

$$x = \frac{540 d_2}{d_1} = 480 \text{ inches per minute}$$

Hence, a strip passing over this particular set of rollers would be shrunk 11.11%.

It will be understood that the number of rollers, dimensions and speeds given in this specific example may be altered since, once the shrinkage characteristics of the particular elastomeric stock being processed are known, it is an easy matter to determine the necessary incremental differences between roll diameters to eliminate residual shrinkage; and, knowing the plastic properties of the stock, the proper roll spacing may be specified. By proper selection of these values residual shrinkage of tire tread stock has been reduced to the point where the desired finished tread strip length varies by only plus or minus $\frac{1}{16}$ inch for the standard sizes of vehicle tires, even after 24 hours following the extrusion; whereas a variation in the order of 6 to 7 inches was usual when the tread strip was processed without benefit of this invention.

It will be understood that, although the invention has been specifically described with respect to its use in processing tire tread stock, it is not limited to such a use. Moreover, modifications of the specifically disclosed details will readily occur to those skilled in the art to which the invention pertains, which is therefore limited only as required by the spirit and scope of the appended claims.

Having thus described the invention, I claim:

1. Apparatus for the reduction of shrinkage in elongated, hot, plastic, elastomeric material; said apparatus comprising a frame, a plurality of material supporting rollers, the outside diameter of each successive roller in the direction of travel of said material being less than the diameter of the preceding roller by a predetermined increment, means rotatably mounting said rollers on said frame axially parallel to one another with the distance between the peripheries of adjacent rollers being less than the diameter of the smallest of said rollers to prevent festooning of said material between said rollers, and means to rotate said rollers jointly at a uniform speed of rotation.

2. The method of producing an elastomeric tire tread strip, comprising the successive operations of forming elastomeric material into an elongated strip, moving the strip in the direction of its length while in a hot plastic condition and while supported by contiguously spaced conveying members at locations sufficiently close to one another to prevent festooning of said strip between said members, and with the rate of conveying of said strip by said members being progressively reduced in the direction of travel of said strip thereby forcibly retarding forward movement of contiguous successive portions of said strip by progressively additive amounts.

3. Apparatus for the forcible reduction of shrinkage in a hot, plastic, elastomeric strip, comprising: a pair of side supports; a plurality of parallel, strip supporting rollers rotatably supported on and between said side supports with their axes defining an inverted catenary curve, the outside diameter of each successive roller in the direction of travel of said strip thereupon being less than the diameter of the immediately preceding roller by a predetermined amount and the distance between the peripheries of adjacent rollers being less than the diameter of the smallest of said rollers to prevent festooning of said strip between said rollers; an identical sprocket mounted on each of said rollers; an endless chain trained about all of said sprockets in series; means for simultaneous tensioning said chain about all of said sprockets; and means to drive said chain in the direction of its length whereby all of said rollers effect travel of said strip in the direction of its length while imposing a progressive shrinkage force thereon.

4. Apparatus of the character described comprising: means for forming elastomeric material into an elongated strip while in a hot, plastic condition; a plurality of strip-supporting rollers rotatably supported in adjacent parallel relationship with their axes defining an inverted catenary curve, the outside diameter of each succeeding roller being less than the diameter of the immediately preceding roller by a predetermined amount in the direction of travel of said tread strip and the spacing between peripheries of adjacent rollers being less than the diameter of the smallest of said rollers to prevent festooning said strip therebetween; identical sprockets mounted on said rolls; a single endless drive chain connecting all of said sprockets in series; and means to drive said chain.

5. The method of removing residual shrinkage from elastomeric material which has been elongated by prior processing thereof comprising conveying said material while in a hot plastic condition, without festooning, on a plurality of parallel disposed material supporting cylindrical surfaces revolving at uniform speeds of rotation and having diameters incrementally reduced in the direction of travel of said material, the peripheries of said surfaces being spaced from one another a distance less than the diameter of the smallest thereof, whereby forward travel of successive contiguous portions of said material is forcibly retarded by progressively additive amounts.

References Cited in the file of this patent

UNITED STATES PATENTS

| | | |
|---|---|---|
| 1,792,316 | Leguillon | Feb. 10, 1931 |
| 1,808,525 | Cadden | June 2, 1931 |
| 1,973,059 | Gerke | Sept. 11, 1934 |